United States Patent
Tsaur et al.

(10) Patent No.: US 9,948,092 B2
(45) Date of Patent: Apr. 17, 2018

(54) CURRENT-MIRROR-BASED ELECTROSTATIC DISCHARGE CLAMPING CIRCUIT AND CURRENT-MIRROR-BASED ELECTROSTATIC DISCHARGE DETECTOR

(71) Applicant: REALTEK SEMICONDUCTOR CORPORATION, Hsinchu (TW)

(72) Inventors: Tay-Her Tsaur, Tai-Nan (TW); Cheng-Cheng Yen, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 211 days.

(21) Appl. No.: 14/964,500

(22) Filed: Dec. 9, 2015

(65) Prior Publication Data
US 2016/0285257 A1    Sep. 29, 2016

(30) Foreign Application Priority Data

Mar. 26, 2015  (TW) .............................. 104109849 A

(51) Int. Cl.
*H02H 9/04*    (2006.01)
(52) U.S. Cl.
CPC .................................. *H02H 9/046* (2013.01)
(58) Field of Classification Search
CPC ................. H02H 9/04; H02H 9/041
USPC ............................................................ 361/56
See application file for complete search history.

(56) References Cited

U.S. PATENT DOCUMENTS

| | | | |
|---|---|---|---|
| 4,797,899 A | 1/1989 | Fuller et al. | |
| 5,946,177 A | 8/1999 | Miller et al. | |
| 6,385,021 B1 | 5/2002 | Takeda et al. | |
| 6,724,603 B2 | 4/2004 | Miller et al. | |
| 6,989,979 B1 | 1/2006 | Tong et al. | |
| 8,498,085 B2 * | 7/2013 | Altolaguirre | H02H 9/046 361/118 |

* cited by examiner

Primary Examiner — Dharti Patel
(74) Attorney, Agent, or Firm — WPAT, PC

(57) ABSTRACT

The present invention discloses a current-mirror-based electrostatic discharge (ESD) clamping circuit comprising: a first power terminal; a second power terminal; a current-mirror-based ESD detector; a driver; and an ESD clamping element. The current-mirror-based ESD detector includes: a resistor coupled between the first power terminal and a detection-output-terminal; a semiconductor capacitor coupled between the detection-output-terminal and an ESD triggered current mirror; and the ESD triggered current mirror operable to electrically connect the semiconductor capacitor and/or the detection-output-terminal with the second power terminal according to the level of a driving signal under an ESD operation. The driver is operable to generate the driving signal according to the voltages of the detection-output-terminal and the first and second power terminals. The ESD clamping element is operable to provide a conducting path from the first power terminal to the second power terminal according to the level of the driving signal under the ESD operation.

15 Claims, 8 Drawing Sheets

CURRENT-MIRROR-BASED ELECTROSTATIC DISCHARGE CLAMPING CIRCUIT AND CURRENT-MIRROR-BASED ELECTROSTATIC DISCHARGE DETECTOR

BACKGROUND OF THE INVENTION

1. Field of the Invention

The present invention relates to an electrostatic discharge circuit, especially to a current-mirror-based electrostatic discharge clamping circuit and a current-mirror-based electrostatic discharge detector.

2. Description of Related Art

An electrostatic discharge (ESD) clamping circuit is capable of preventing an integrated circuit from the damage of electrostatic discharge. FIG. 1 illustrates a conventional ESD clamping circuit 100 including: a high-voltage terminal 110; a low-voltage terminal 120; a resistor 130; a capacitor 140; an inverter 150; and a switch 160. Under a normal mode (that is to say an ESD-free mode), the capacitor 140 blocks DC voltage while the voltage of the input end of the inverter 150 is a high voltage and the voltage of its output end is a low voltage, so that the switch 160 is not conductive due to the low voltage. Under an ESD mode, the capacitor 140 is not able to reflect the instant voltage variation of the high-voltage terminal 110 (because the voltage of a capacitor will not substantially change immediately) while the voltage of the input end of the inverter 150 is a low voltage and the voltage of its output end is a high voltage, so that the switch 160 is conductive due to the high voltage and carries out electrostatic discharge.

On the basis of the above, the capacitor 140 of the ESD clamping circuit 100 is usually a MOS (metal oxide semiconductor) capacitor in which the material of its gate layer could be electricity-conductive material (e.g. polysilicon) other than metal. However, in an advanced semiconductor process, the thickness of the gate layer is getting thinner and thinner, which leads to a more and more serious gate leakage problem. Consequently, the ESD clamping circuit 100 of FIG. 1 suffers the same problem, and gate leakage will pass through the capacitor 140 which is not supposed to be conductive ideally. This problem not only causes undesired power-consumption, but also makes the voltage of the input end of the inverter 150 unstable. The voltage of the input end may change from a high voltage to a low voltage under the aforementioned normal mode, which makes the switch 160 conductive improperly.

People who are interested in the prior art may refer to the following documents: U.S. Pat. Nos. 4,797,899, 5,946,177, 6,385,021, 6,724,603, 6,989,979 and 8,498,085.

SUMMARY OF THE INVENTION

An object of the present invention is to provide a current-mirror-based electrostatic discharge clamping circuit and a current-mirror-based electrostatic discharge detector capable of making improvements over the prior art.

The present invention discloses a current-mirror-based electrostatic discharge (ESD) clamping circuit. An embodiment of the current-mirror-based ESD clamping circuit comprises: a first power terminal; a second power terminal; a current-mirror-based ESD detector; a driver; and an ESD clamping element. The current-mirror-based ESD detector is coupled between the first power terminal and the second power terminal, and includes a first impedance, a second impedance and an ESD trigger-type current mirror. The first impedance is coupled between the first power terminal and a detection output end; the second impedance is coupled between the detection output end and an ESD trigger-type current mirror, operable to determine the voltage of the detection output end according to the voltage of the first power terminal in conjunction with the first impedance under a normal operation, and operable to determine the voltage of the detection output end according to the voltages of the first and second power terminals in conjunction with the first impedance and the ESD trigger-type current mirror under an ESD clamping operation, in which one of the first and second impedances is a resistor and the other one is a semiconductor capacitor; and the ESD trigger-type current mirror is operable to provide a path for the second impedance and/or the detection output end to be electrically coupled to the second power terminal according to the level of a driving signal under the ESD clamping operation. The driver is operable to generate the driving signal according to the voltage of the detection output end and the voltages of the first and second power terminals in which the level of the driving signal under the normal operation is different from the level of the driving signal under the ESD clamping operation. The ESD clamping element is operable to provide a path for the first power terminal to be coupled to the second power terminal according to the level of the driving signal under the ESD clamping operation.

Another embodiment of the said current-mirror-based ESD clamping circuit comprises: a first power terminal; a second power terminal; a current-mirror-based ESD detector; a driver; an ESD clamping element; and a trigger signal generator. The current-mirror-based ESD detector is coupled between the first power terminal and the second power terminal, and includes a first impedance, a second impedance and an ESD trigger-type current mirror. The first impedance is coupled between the first power terminal and a detection output end; the second impedance is coupled between the detection output end and an ESD trigger-type current mirror, operable to determine the voltage of the detection output end according to the voltage of the first power terminal in conjunction with the first impedance under a normal operation, and operable to determine the voltage of the detection output end according to the voltages of the first and second power terminals in conjunction with the first impedance and the ESD trigger-type current mirror under an ESD clamping operation, in which one of the first and second impedances is a resistor and the other one is a semiconductor capacitor; and the ESD trigger-type current mirror is operable to provide a path for the second impedance and/or the detection output end to be electrically coupled to the second power terminal according to the level of a trigger signal under the ESD clamping operation. The driver is operable to generate a driving signal according to the voltage of the detection output end. The ESD clamping element is operable to provide a path for the first power terminal to be coupled to the second power terminal according to the level of the driving signal under the ESD clamping operation. The trigger signal generator is operable to generate the trigger signal according to the voltages of the first and second power terminals or the voltages of a third and a fourth power terminals, wherein the level of the trigger signal under the normal operation is different from the level of the trigger signal under the ESD clamping operation.

The present invention further discloses a current-mirror-based electrostatic discharge (ESD) detector. An embodiment of the current-mirror-based ESD detector comprises: a first impedance, a second impedance and an ESD trigger-type current mirror in which one of the first and second impedances is a resistor and the other one is a semiconductor capacitor. The first impedance is coupled between a first power terminal and a detection output end; the second impedance is coupled between the detection output end and an ESD trigger-type current mirror, operable to determine the voltage of the detection output end according to the voltage of the first power terminal in conjunction with the first impedance under a normal operation, and operable to determine the voltage of the detection output end according to the voltages of the first power terminal and a second power terminal in conjunction with the first impedance and the ESD trigger-type current mirror under an ESD clamping operation; and the ESD trigger-type current mirror is operable to electrically disconnect the second impedance and/or the detection output end from the second power terminal according to the level of a trigger signal under the normal operation, and operable to electrically connect the second impedance and/or the detection output end to the second power terminal according to the level of the trigger signal under the ESD clamping operation, wherein the level of the trigger signal under the normal operation is different from the level of the trigger signal under the ESD clamping operation.

These and other objectives of the present invention will no doubt become obvious to those of ordinary skill in the art after reading the following detailed description of the preferred embodiments that are illustrated in the various figures and drawings.

DETAILED DESCRIPTION OF THE PREFERRED EMBODIMENTS

The following description is written by referring to terms acknowledged in this invention field. If any term is defined in this specification, such term should be explained accordingly.

The present disclosure includes a current-mirror-based electrostatic discharge (ESD) clamping circuit applicable to an integrated circuit or an electronic device for the prevention of gate leakage. On account of that some element of the current-mirror-based ESD clamping circuit alone could be known, the detail of such element is omitted provided that this omission nowhere dissatisfies the requirements of disclosure and enablement. Besides, if an implementation derived from one or more of the embodiments in the following description is practicable, a person of ordinary skill in the art can selectively make use of some or all of the features in one embodiment or selectively make use of the combination of some or all features in several embodiments to have the implementation come true, so as to increase the flexibility of carrying out the present invention.

Figure 2:
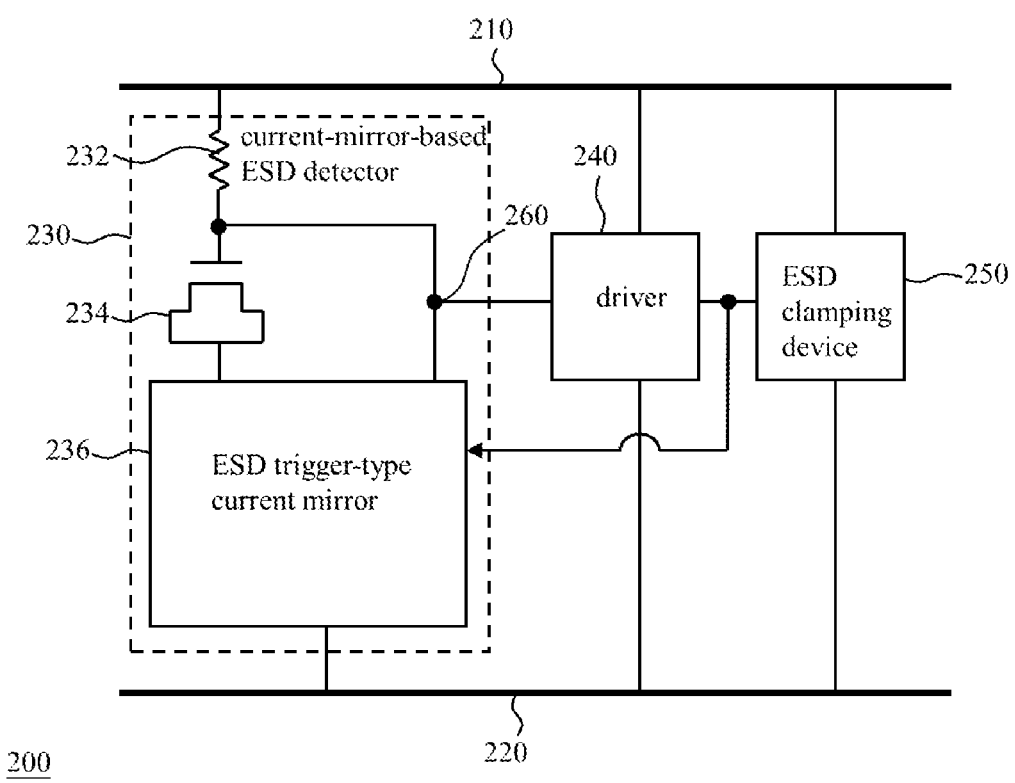
FIG. 2 illustrates an embodiment of the current-mirror-based electrostatic discharge clamping circuit of the present invention.

Please refer to FIG. 2 which illustrates an embodiment of the current-mirror-based ESD clamping circuit of the present invention. As it is shown in FIG. 2, the current-mirror-based ESD clamping circuit 200 comprises: a first power terminal 210; a second power terminal 220; a current-mirror-based ESD detector 230; a driver 240; and an ESD clamping element 250. The said first and second power terminals 210, 220 could be a high-voltage terminal (e.g., a positive power terminal $V_{DD}$) and a low-voltage terminal (e.g., a negative power terminal or a ground terminal $V_{SS}$) respectively, or other kinds of power terminals. The current-mirror-based ESD detector 230 is coupled between the first power terminal 210 and the second power terminal 220, and includes a resistor 232, a semiconductor capacitor 234 and an ESD trigger-type current mirror 236. The resistor 232 is coupled between the first power terminal 210 and a detection output end 260; the semiconductor capacitor 234 could be a MOS (metal oxide semiconductor) capacitor or the equivalent thereof, and is coupled between the detection output end 260 and the ESD trigger-type current mirror 236, so as to determine the voltage of the detection output end 260 according to the voltage of the first power terminal 210 in conjunction with the resistor 232 under a normal operation and determine the voltage of the detection output end 260 according to the voltages of the first and second power terminals 210, 220 in conjunction with the resistor 232 and the ESD trigger-type current mirror 236 under an ESD clamping operation, wherein when electrostatic discharge occurs, the clamping circuit 200 enters the ESD clamping operation from the normal operation. The ESD trigger-type current mirror 236 is operable to provide a path for the semiconductor capacitor 234 and/or the detection output end 260 to be electrically coupled to the second power terminal 220 according to the level of a driving signal under the ESD clamping operation. Please note that the disposal of the resistor and the semiconductor capacitor in each embodiment of the present invention could be exchanged in consideration of the design of ESD clamping circuit, so as to increase the flexibility of carrying out the present invention. In addition, since the gate leakage is serious in an advanced process, when the size of a semiconductor capacitor conforms to an advanced semiconductor process such as a process with gate length of MOSFET device equal to or shorter than 90 nanometer, the benefit of the present invention is more apparent.

Please refer to FIG. 2 again. The driver 240 could be an inverter or a known or self-developed element that is capable of driving the ESD clamping element 250 to execute electrostatic discharge, and operable to generate the driving signal according to the voltage of the detection output end 260 and the voltages of the first and second power terminals 210, 220. More specifically, when electrostatic discharge occurs, the voltage difference of the operation voltages which originate from the first and second power terminals 210, 220 and are received by the driver 240 increases greatly in short time (e.g., the voltage difference changing from 3V to 4 KV), so that the instant level of the driving signal outputted by the driver 240 changes correspondingly (e.g., changing from a low level to a high level), which makes the aforementioned ESD trigger-type current mirror 236 enter the ESD clamping operation from the normal operation and makes the aforementioned ESD clamping element 250 carry out electrostatic discharge. After the electrostatic discharge finished, the semiconductor capacitor 234 will block stable DC voltage and thereby make the voltage of the detection output end 260 return to the original level (e.g., returning to a high level from a low level), so that the level of the driving signal outputted by the driver 240 will return to the original level (e.g., returning to a low level from a high level), which makes the ESD clamping circuit 200 return to the normal operation from the ESD clamping operation, wherein the level of the driving signal under the normal operation is different from the level of the driving signal under the ESD clamping operation. The ESD clamping element 250 could be a MOS transistor or an element capable of being turned on or off in accordance with the driving signal, and is operable to provide a path for the first power terminal 210 to be coupled to the second power terminal 220 according to the level of the driving signal under the ESD clamping operation.

Figure 3:
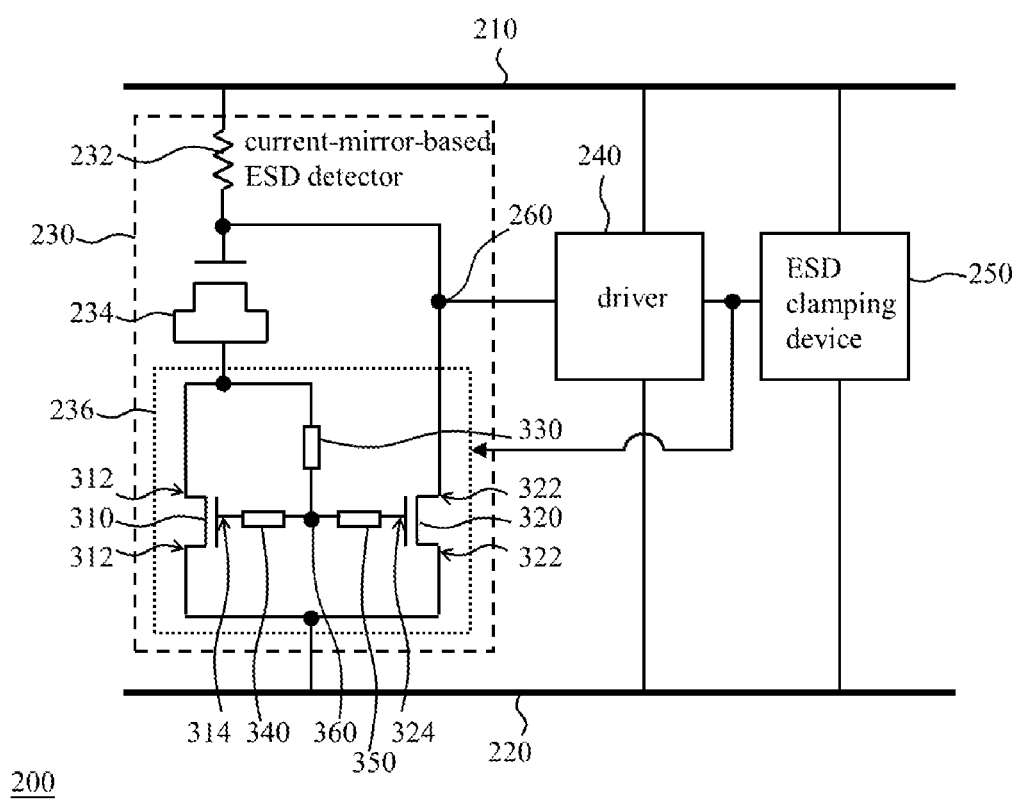
FIG. 3 illustrates an embodiment of the electrostatic discharge trigger-type current mirror of FIG. 2.

An embodiment of the aforementioned ESD trigger-type current mirror 236 is shown in FIG. 3, including a first transistor 310, a second transistor 420, a first path 330, a second path 340 and a third path 350. The said first transistor 410 includes two first electrodes 312 and one first gate 314 in which the two first electrodes 312 are coupled with the semiconductor capacitor 324 and the second power terminal 220 respectively. The said second transistor 320 includes two second electrodes 322 and one second gate 324 in which the two second electrodes 322 are coupled with the detection output end 260 and the second power terminal 220 respectively. Furthermore, the size of the second transistor 320 could be similar to or different from the size of the first transistor 310. For instance, the size of the second transistor 320 is smaller than the size of the first transistor 310 to increase the effectual capacitance of the semiconductor capacitor 234 under the ESD clamping operation. The said first path 330 has one end coupled to a node between the semiconductor capacitor 234 and the first transistor 310, and another end coupled to a gate node 360. The said second path 340 is coupled to a node between the first gate 314 and the gate node 360. The said third path 350 is coupled to a node between the second gate 324 and the gate node 360. In addition, at least one of the first, second and third paths 330, 340, 350 includes an ESD trigger-type switch (as shown in FIG. 4a and FIG. 4b) which is not conductive (that is to say the switch functioning as an open circuit) according to the level of the driving signal under the aforementioned normal operation for the prevention of gate leakage and conductive (that is to say the switch functioning as an short circuit) according to the level of the driving signal under the ESD clamping operation for the assistance in executing electrostatic discharge.

Figure 4A:
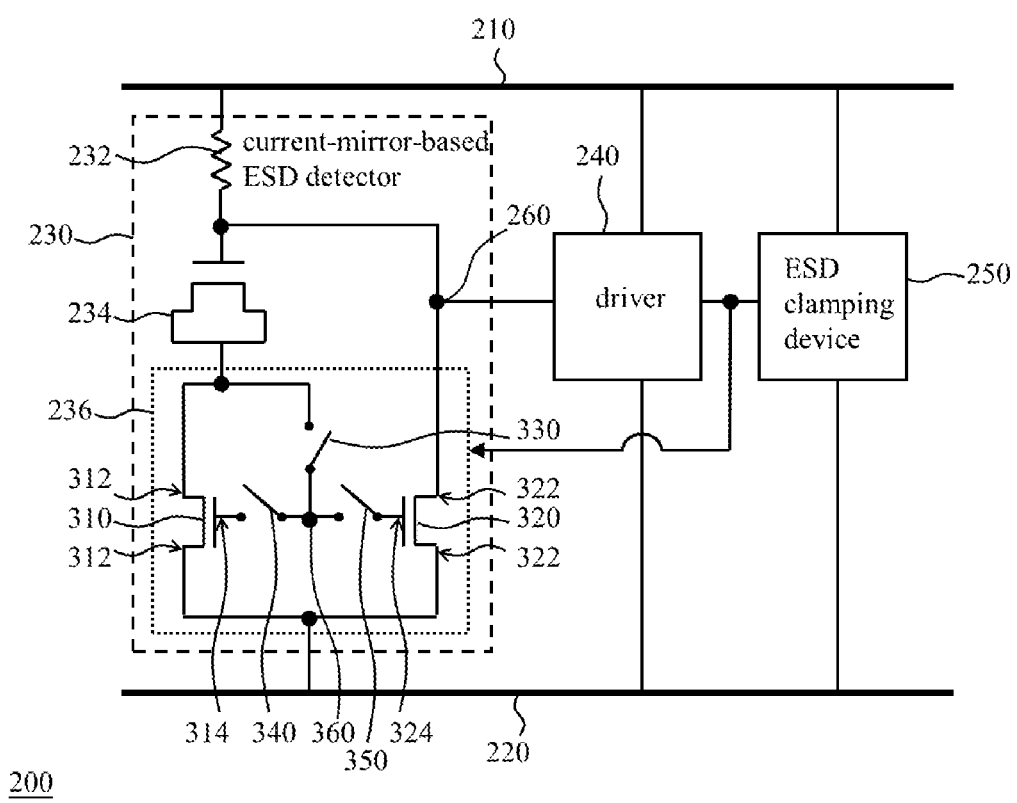
FIG. 4a illustrates an exemplary implementation of the embodiment of FIG. 3.
Figure 4B:
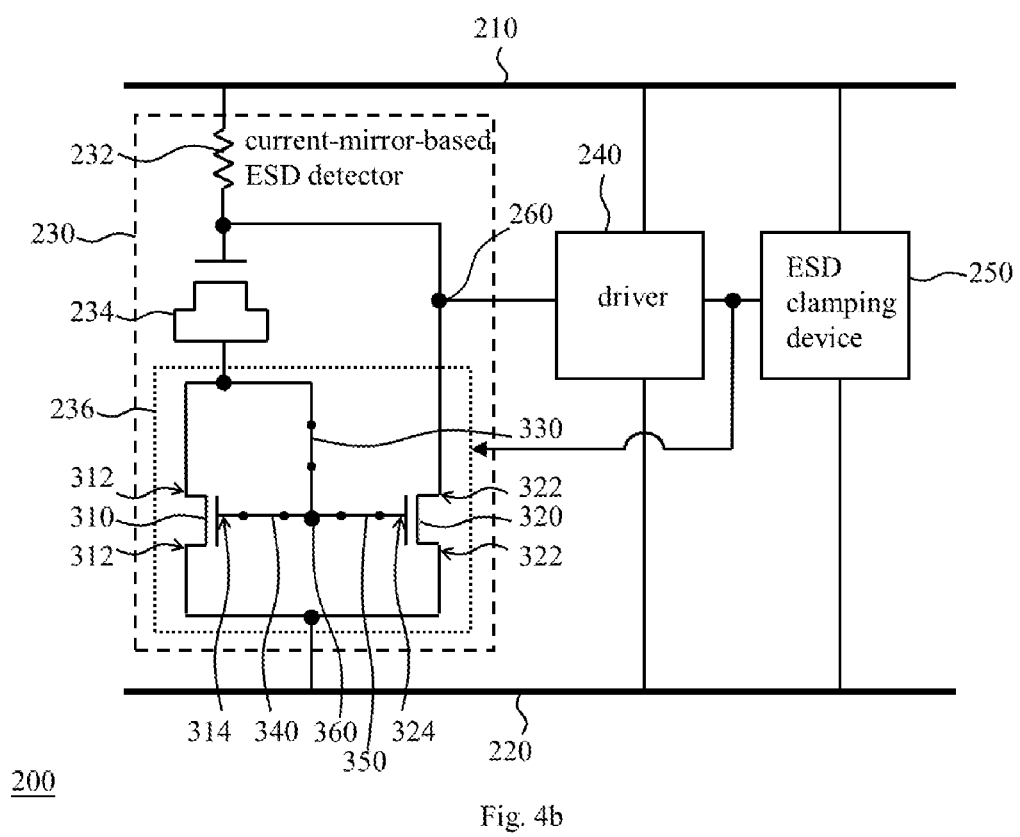
FIG. 4b illustrates another exemplary implementation of the embodiment of FIG. 3.

FIG. 4a and FIG. 4b are exemplary implementations of the embodiment of FIG. 3. As shown in FIGS. 4a, 4b, each of the first, second and third paths 330, 340, 350 includes an ESD trigger-type switch, and all the switches are not conductive according to the level of the driving signal under the normal operation (as shown in FIG. 4a) and conductive according to the level of the driving signal under the ESD clamping operation (as shown in FIG. 4b). Although each of the said paths in FIGS. 4a, 4b includes an ESD trigger-type switch, as long as at least one of the paths includes an ESD trigger-type switch, the gate leakage can be suppressed.

Figure 5:
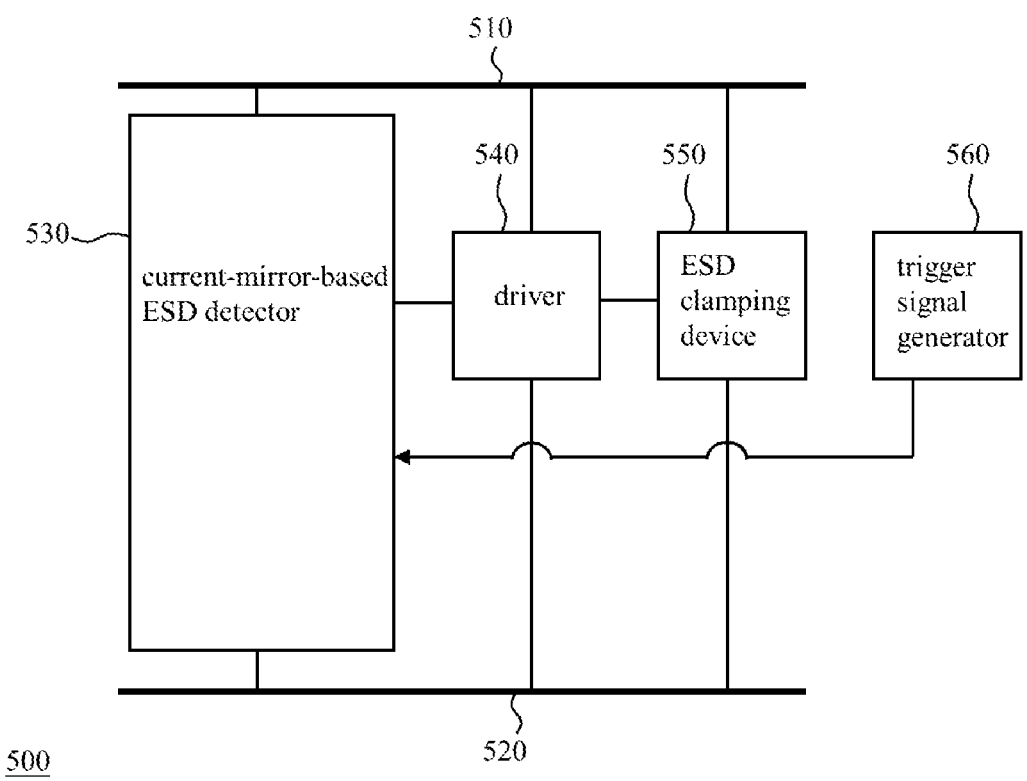
FIG. 5 illustrates another embodiment of the current-mirror-based electrostatic discharge clamping circuit of the present invention.

The embodiment of FIG. 2 makes use of the driving signal as the trigger signal to allow the ESD trigger-type current mirror 236 to form a conductive path. However, the present invention may use other signals as the trigger signal. FIG. 5 illustrates another embodiment of the current-mirror-based ESD clamping circuit of the present invention. As it is shown in FIG. 5, the clamping circuit 500 comprises: a first power terminal 510; a second power terminal 520; a current-mirror-based ESD detector 530; a driver 540; an ESD clamping element 550; and a trigger signal generator 560. The implementations and modifications of the first power terminal 510, the second power terminal 520, the current-mirror-based ESD detector 530, the driver 540 and the ESD clamping element 550 are similar to those of the embodiment of FIG. 2. The major difference between the embodiments of FIG. 2 and FIG. 5 is that the current-mirror-based ESD detector 530 of FIG. 5 responds to the trigger signal generated by the trigger signal generator 560. In this embodiment, the trigger signal generator 560 can generate the trigger signal (which may be equivalent to or derived from the driving signal of the driver 540 while the trigger signal generator 560 may be set between the first and second power terminals 510, 520 or between other power terminals) according to the voltages of the first and second power terminals 510, 520, or generate the trigger signal according to the voltages of a third and a fourth power terminals (e.g., the third and fourth power terminals 610, 620 of FIG. 6), wherein the level of the trigger signal under a normal operation is different from the level of the trigger signal under an ESD clamping operation. The definitions of the normal operation and the ESD clamping operation are described in the preceding paragraphs.

Figure 1:
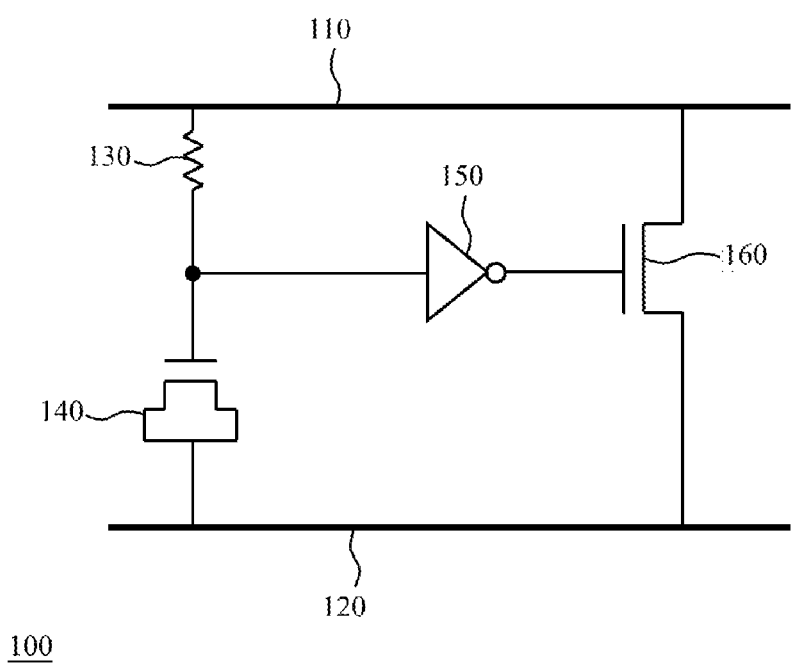
FIG. 1 illustrates a conventional electrostatic discharge clamping circuit.
Figure 6:
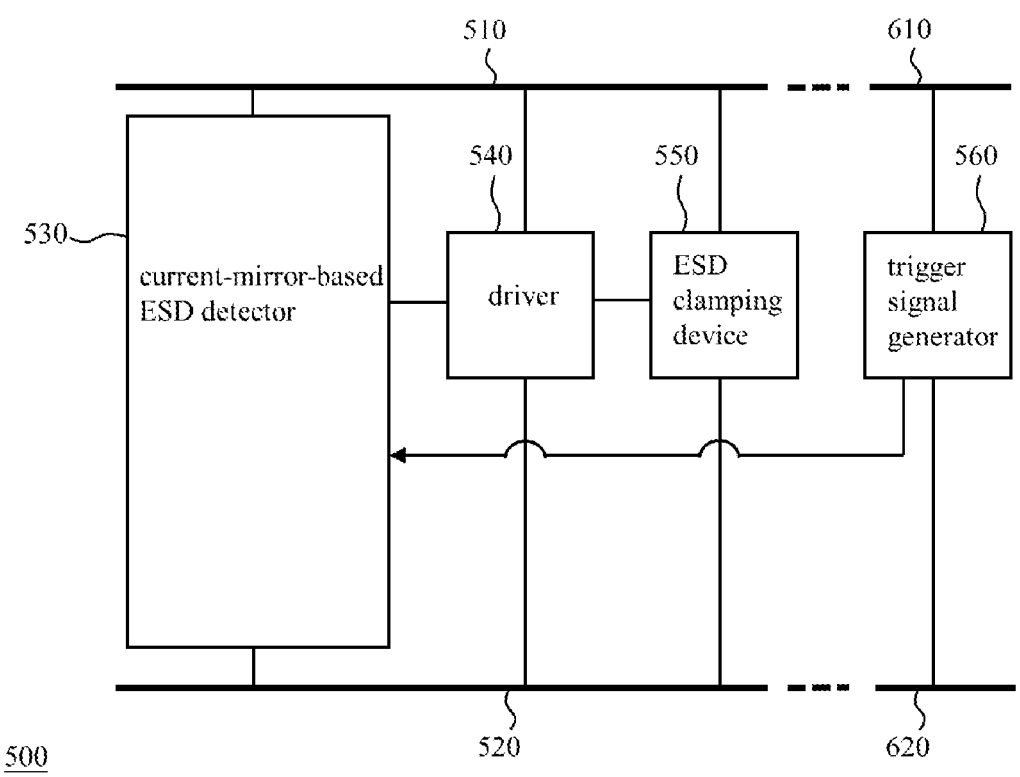
FIG. 6 illustrates an exemplary implementation of the embodiment of FIG. 5.

FIG. 6 illustrates an exemplary implementation of the embodiment of the FIG. 5. As it is shown in FIG. 6, the trigger signal generator 560 could be another ESD clamping circuit or a circuit capable of reflecting the occurrence of electrostatic discharge between the first and second power terminals 510, 520, and is set between a third power terminal 610 and a fourth power terminal 620 in which the power domain of the third and fourth power terminals 610, 620 is different from the power domain of the first and second power terminals 510, 520. For instance, the voltages of the first and third power terminals 510, 610 are different, and the voltages of the second and fourth power terminals are different. It should be noted that if the said signal generator 560 is an ESD clamping circuit, it could be a known circuit (such as the circuit of FIG. 1 or the equivalent thereof) or the circuit of the present invention. It should be also noted that different power domains could be separated (as they are illustrated with the dotted line of FIG. 6) by the setting of appropriate circuits (e.g., a combination of a forward-bias diode and a reverse-bias diode), and since this kind of setting is well known, the detail thereof is omitted.

Figure 7:
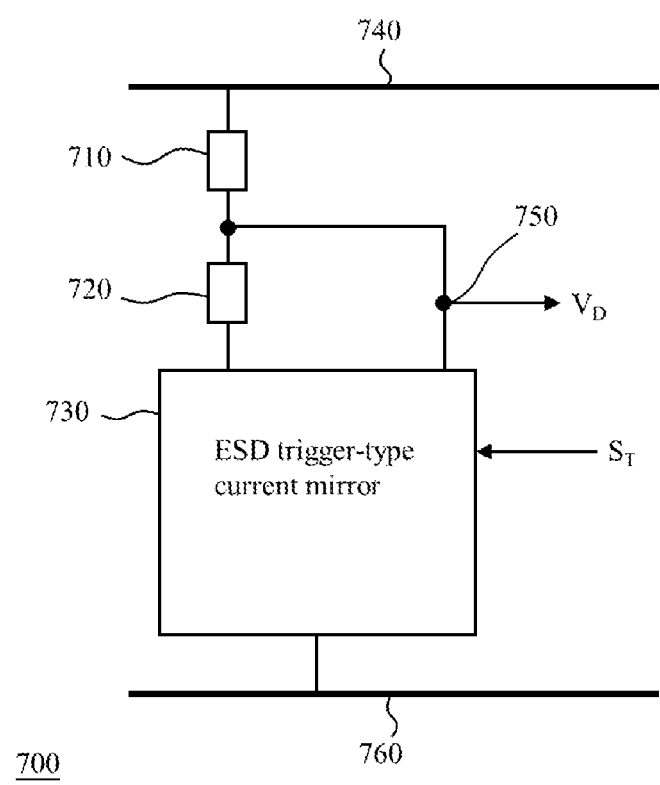
FIG. 7 illustrates an embodiment of the current-mirror-based electrostatic discharge detector of the present invention.

The aforementioned current-mirror-based ESD detector could be separated from the ESD clamping circuit of the present invention and put into practice with other known of self-developed circuits. FIG. 7 illustrates an embodiment of the current-mirror-based ESD detector of the present invention. The detector 700 comprises a first impedance 710, a second impedance 720 and an ESD trigger-type current mirror 730 in which one of the first and second impedances 710, 720 is a resistor and the other one is a semiconductor capacitor. The said first impedance 710 is coupled between a first power terminal 740 and a detection output end 750. The said second impedance 720 is coupled between the detection output end 750 and the ESD trigger-type current mirror 730, operable to determine the voltage $V_D$ of the detection output end 750 according to the voltage of the first power terminal 740 in conjunction with the first impedance 710 under a normal operation and operable to determine the voltage $V_D$ of the detection output end 750 according to the voltages of the first power terminal 740 and a second power terminal 760 in conjunction with the first impedance 710 and the ESD trigger-type current mirror 730 under an ESD clamping operation, wherein the definitions of the normal operation and the ESD clamping operation are described in the preceding paragraphs. The said ESD trigger-type current mirror 730 could be the current mirror 236 of FIG. 2 or the equivalent thereof, and is operable to electrically disconnect the second impedance 720 and/or the detection output end 750 from the second power terminal 760 according to the level of a trigger signal $S_T$ (e.g., the driving signal of the driver 240 of FIG. 2, or the trigger signal of the trigger signal generator 560 of FIG. 5) under the normal operation (as shown in FIG. 4a), and operable to electrically connect the second impedance 720 and/or the detection output end 750 to the second power terminal 760 according to the level of the trigger signal $S_T$ under the ESD clamping operation (as shown in FIG. 4b), wherein the level of the trigger signal $S_T$ under the normal operation is different from the level of the trigger signal $S_T$ under the ESD clamping operation.

Since those of ordinary skill in the art can appreciate the detail and modification of each embodiment by referring to the disclosure of all the embodiments, which means that the features of one embodiment can be applied to the other embodiments in an reasonable way, therefore repeated and redundant description is omitted while the existing explanation is believed to be enough for understanding and enablement. It should be noted that the shape, size, and ratio of any element in the figures of this specification are just exemplary for understanding, not limitations in the scope of this invention. It should be also noted that the terms "according to" in this specification could be "directly or indirectly according to", and any two adjacent elements in the figures of this specification could be connected with each other directly as shown in these figures or connected with each other through one or more intermediate elements.

In summary, the current-mirror-based ESD clamping circuit and the current-mirror-based ESD detector of the present invention can prevent gate leakage, and therefore prevent the energy loss and the risk of maloperation due to ESD.

The aforementioned descriptions represent merely the preferred embodiments of the present invention, without any intention to limit the scope of the present invention thereto. Various equivalent changes, alterations, or modifications based on the claims of present invention are all consequently viewed as being embraced by the scope of the present invention.

What is claimed is:

1. A current-mirror-based electrostatic discharge (ESD) clamping circuit, comprising:
    a first power terminal;
    a second power terminal;
    a current-mirror-based ESD detector, coupled between the first power terminal and the second power terminal, including:
    a first impedance coupled between the first power terminal and a detection output end;
    a second impedance, coupled between the detection output end and an ESD trigger-type current mirror, operable to determine the voltage of the detection output end according to the voltage of the first power terminal in conjunction with the first impedance under a normal operation and operable to determine the voltage of the detection output end according to the voltages of the first and second power terminals in conjunction with the first impedance and the ESD trigger-type current mirror under an ESD clamping operation, in which one of the first and second impedances is a resistor and the other one is a semiconductor capacitor; and
    the ESD trigger-type current mirror operable to provide a path for the second impedance and/or the detection output end to be electrically coupled to the second power terminal according to the level of a driving signal under the ESD clamping operation, the ESD trigger-type current mirror including:
        a first transistor including two first electrodes and one first gate in which the two first electrodes are coupled with the second impedance and the second power terminal respectively;
        a second transistor including two second electrodes and one second gate in which the two second electrodes are coupled with the detection output end and the second power terminal respectively;
        a first path having one end coupled between the second impedance and the first transistor and having another end coupled to a gate node;
        a second path coupled between the first gate and the gate node; and
        a third path coupled between the second gate and the gate node, in which at least one of the first path, the second path and the third path includes an ESD trigger-type switch which is not conductive according to the level of the driving signal under the normal operation and conductive according to the level of the driving signal under the ESD clamping operation;
    a driver operable to generate the driving signal according to the voltage of the detection output end and the voltages of the first and second power terminals in which the level of the driving signal under the normal operation is different from the level of the driving signal under the ESD clamping operation; and
    an ESD clamping element operable to provide a path for the first power terminal to be coupled to the second power terminal according to the level of the driving signal under the ESD clamping operation.

2. The current-mirror-based ESD clamping circuit of claim 1, wherein the first, second and third paths include a first ESD trigger-type switch, a second ESD trigger-type switch and a third ESD trigger-type switch respectively in which the first, second and third ESD switches are not conductive according to the level of the driving signal under the normal operation and conductive according to the level of the driving signal under the ESD clamping operation.

3. The current-mirror-based ESD clamping circuit of claim 1, wherein the size of the first transistor is smaller than the size of the second transistor.

4. The current-mirror-based ESD clamping circuit of claim 1, wherein the size of the semiconductor capacitor conforms to a semiconductor process with gate length of MOSFET device equal to or shorter than 90 nanometer.

5. A current-mirror-based electrostatic discharge (ESD) clamping circuit, comprising:
    a first power terminal;
    a second power terminal;
    a current-mirror-based ESD detector, coupled between the first power terminal and the second power terminal, including:
    a first impedance coupled between the first power terminal and a detection output end;
    a second impedance, coupled between the detection output end and an ESD trigger-type current mirror, operable to determine the voltage of the detection output end according to the voltage of the first power terminal in conjunction with the first impedance under a normal operation and operable to determine the voltage of the detection output end according to the voltages of the first and second power terminals in conjunction with the first impedance and the ESD trigger-type current mirror under an ESD clamping operation, in which one of the first and second impedances is a resistor and the other one is a semiconductor capacitor; and the ESD trigger-type current mirror operable to provide a path for the second impedance and/or the detection output end to be electrically coupled to the second power terminal according to the level of a trigger signal under the ESD clamping operation;

a driver operable to generate a driving signal according to the voltage of the detection output end;

an ESD clamping element operable to provide a path for the first power terminal to be coupled to the second power terminal according to the level of the driving signal under the ESD clamping operation; and a trigger signal generator operable to generate the trigger signal according to the voltages of the first and second power terminals or the voltages of a third and a fourth power terminals, wherein the level of the trigger signal under the normal operation is different from the level of the trigger signal under the ESD clamping operation.

6. The current-mirror-based ESD clamping circuit of claim 5, wherein the trigger signal generator is another ESD clamping circuit.

7. The current-mirror-based ESD clamping circuit of claim 5, wherein the power domain of the first and second power terminals is different from the power domain of the third and fourth power terminals.

8. The current-mirror-based ESD clamping circuit of claim 5, wherein the ESD trigger-type current mirror includes:

a first transistor including two first electrodes and one first gate in which the two first electrodes are coupled with the second impedance and the second power terminal respectively;

a second transistor including two second electrodes and one second gate in which the two second electrodes are coupled with the detection output end and the second power terminal respectively;

a first path having one end coupled between the second impedance and the first transistor and having another end coupled to a gate node;

a second path coupled between the first gate and the gate node; and a third path coupled between the second gate and the gate node, wherein at least one of the first, second and third paths includes an ESD trigger-type switch which is not conductive according to the level of the trigger signal under the normal operation and conductive according to the level of the trigger signal under the ESD clamping operation.

9. The current-mirror-based ESD clamping circuit of claim 8, wherein the size of the first transistor is smaller than the size of the second transistor.

10. The current-mirror-based ESD clamping circuit of claim 5, wherein the size of the semiconductor capacitor conforms to a semiconductor process with gate length of MOSFET device equal to or shorter than 90 nanometer.

11. A current-mirror-based electrostatic discharge (ESD) detector, comprising:

a first impedance coupled between a first power terminal and a detection output end;

a second impedance, coupled between the detection output end and an ESD trigger-type current mirror, operable to determine the voltage of the detection output end according to the voltage of the first power terminal in conjunction with the first impedance under a normal operation and operable to determine the voltage of the detection output end according to the voltages of the first power terminal and a second power terminal in conjunction with the first impedance and the ESD trigger-type current mirror under an ESD clamping operation, in which one of the first and second impedances is a resistor and the other one is a semiconductor capacitor; and the ESD trigger-type current mirror operable to electrically disconnect the second impedance and/or the detection output end from the second power terminal according to the level of a trigger signal under the normal operation, and operable to electrically connect the second impedance and/or the detection output end to the second power terminal according to the level of the trigger signal under the ESD clamping operation, wherein the level of the trigger signal under the normal operation is different from the level of the trigger signal under the ESD clamping operation.

12. The current-mirror-based ESD detector of claim 11, wherein the trigger signal originates from an input signal of an ESD clamping element.

13. The current-mirror-based ESD detector of claim 11, wherein the ESD trigger-type current mirror includes:

a first transistor including two first electrodes and one first gate in which the two first electrodes are coupled with the second impedance and the second power terminal respectively;

a second transistor including two second electrodes and one second gate in which the two second electrodes are coupled with the detection output end and the second power terminal respectively;

a first path having one end coupled between the second impedance and the first transistor and having another end coupled to a gate node;

a second path coupled between the first gate and the gate node; and a third path coupled between the second gate and the gate node, wherein at least one of the first, second and third paths includes an ESD trigger-type switch which is not conductive according to the level of the trigger signal under the normal operation and conductive according to the level of the trigger signal under the ESD clamping operation.

14. The current-mirror-based ESD detector of claim 13, wherein the size of the first transistor is smaller than the size of the second transistor.

15. The current-mirror-based ESD detector of claim 11, wherein the size of the semiconductor capacitor is a MOS (metal oxide semiconductor) capacitor and conforms to a semiconductor process with gate length of MOSFET device equal to or shorter than 90 nanometer.

* * * * *